United States Patent
Katana et al.

(10) Patent No.: US 12,449,003 B2
(45) Date of Patent: Oct. 21, 2025

(54) SEALING ARRANGEMENT FOR WHEEL BEARINGS, AND WHEEL BEARING UNIT COMPRISING A SEALING ARRANGEMENT

(71) Applicant: Schaeffler Technologies AG & Co. KG, Herzogenaurach (DE)

(72) Inventors: Branko Katana, Herzogenaurach (DE); Marco Krapf, Burkardroth (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 88 days.

(21) Appl. No.: 18/026,445

(22) PCT Filed: Sep. 29, 2021

(86) PCT No.: PCT/DE2021/100786
§ 371 (c)(1),
(2) Date: Mar. 15, 2023

(87) PCT Pub. No.: WO2022/073548
PCT Pub. Date: Apr. 14, 2022

(65) Prior Publication Data
US 2023/0383791 A1    Nov. 30, 2023

(30) Foreign Application Priority Data
Oct. 6, 2020  (DE) .............. 10 2020 126 119.5

(51) Int. Cl.
*F16C 33/78*    (2006.01)
*B60B 27/00*    (2006.01)
*F16C 33/80*    (2006.01)

(52) U.S. Cl.
CPC ...... *F16C 33/7823* (2013.01); *B60B 27/0073* (2013.01); *F16C 33/7883* (2013.01); *F16C 33/805* (2013.01); *F16C 2326/02* (2013.01)

(58) Field of Classification Search
CPC .............. F16C 33/7823; F16C 33/7869; F16C 33/7879; F16C 33/7883; F16C 33/805; F16C 2326/02; B60B 27/0073
See application file for complete search history.

(56) References Cited

U.S. PATENT DOCUMENTS

2011/0262069 A1*  10/2011  Baba ................... B60B 27/0073
                                                                                277/565
2017/0198748 A1    7/2017  Seo
(Continued)

FOREIGN PATENT DOCUMENTS

DE          10358876 A1    7/2005
DE       102009052311 A1    5/2011
(Continued)

*Primary Examiner* — Alan B Waits
(74) *Attorney, Agent, or Firm* — Matthew V Evans

(57) ABSTRACT

A sealing arrangement for a wheel bearing includes a carrier element connectable to a first bearing part of the wheel bearing, a resilient sealing element, and a counterflow plate connectable to a second bearing part of the wheel bearing. The resilient sealing element includes a resilient main body arranged on the carrier element, first and second axial sealing lips extending away from the resilient main body, and a radial sealing lip extending away from the resilient main body. The counterflow plate is arranged with one side facing the carrier element such that the first and second axial sealing lips, and the radial sealing lip, are in sliding contact with the counterflow plate. The first axial sealing lip, second axial sealing lip, and radial sealing lip rest against the counterflow plate with respective contact pressures.

18 Claims, 1 Drawing Sheet

(56) References Cited

U.S. PATENT DOCUMENTS

2020/0149589 A1\* 5/2020 Sato .................... F16J 15/3264
2020/0277993 A1\* 9/2020 Seki .................... F16J 15/3232

FOREIGN PATENT DOCUMENTS

| DE | 102010034385 A1 | 2/2012 |
| DE | 112010000730 T5 | 8/2012 |
| EP | 3653912 A1 | 5/2020 |
| JP | 2007211791 A | 8/2007 |
| JP | 2012207769 A | 10/2012 |
| JP | 2016038024 A | 3/2016 |
| JP | 2019157892 A | 9/2019 |
| WO | 2021121466 A1 | 6/2021 |

\* cited by examiner

SEALING ARRANGEMENT FOR WHEEL BEARINGS, AND WHEEL BEARING UNIT COMPRISING A SEALING ARRANGEMENT

CROSS-REFERENCE TO RELATED APPLICATIONS

This application is the United States National Phase of PCT Appln. No. PCT/DE2021/100786 filed Sep. 29, 2021, which claims priority to German Application No. DE102020126119.5 filed Oct. 6, 2020, the entire disclosures of which are incorporated by reference herein.

TECHNICAL FIELD

The present disclosure relates to a sealing arrangement for a wheel bearing, a use of such a sealing arrangement for sealing a wheel bearing and a wheel bearing unit with such a sealing arrangement.

BACKGROUND

Seals for bearings, such as roller bearings, plain bearings, etc., are well known. They are intended to prevent dirt from penetrating the bearing and, where applicable, to prevent lubricant from escaping from the bearing, in order to ensure the longest possible service life of the bearing.

In the case of wheel bearings with rolling elements, there is a sliding seal on both sides of the space filled with lubricant that receives the raceways and rolling elements, to ensure that neither solid particles nor corrosive media can penetrate this space. Since slight tilting within the bearing can occur when driving, e.g. during lateral acceleration, there is a risk that known seals, in particular so-called lip seals, will lift off sliding surfaces, which means that solid particles, e.g. dirt or dust, can penetrate the bearing. The known seals can also interact with a so-called flinger made of formed sheet metal. The flinger is usually connected to a rotating wheel hub or a rotating wheel bearing flange and can form an additional sealing labyrinth together with another sheet metal ring arranged in a stationary part of the wheel suspension. In addition, sealing lips of at least one sealing ring extend in the axial or radial direction and are slidingly guided by the flinger. The aforementioned components of the seal can also be an integral part of a seal cartridge in which the sealing lips are axially prestressed in a defined manner.

On the wheel bearing there is a mainly axially directed opening on both sides in the axial direction, which are coupled to one another, between the two involved rotating partners, by the wheel bearing. The vehicle-side axial opening is substantially axially directed and is at times covered by an axle journal of an adjacent constant velocity joint. Due to the immediately adjacent wheel bearing flange, the opening on the wheel flange side in the axial direction is directed radially outwards and is therefore very easy to reach, for example, for spray water. In order to improve the sliding seal contact present on the wheel bearing flange, the flinger made of formed sheet metal is inserted at the wheel bearing flange adjacent to the wheel bearing flange before the wheel bearing is installed on the wheel hub.

During operation of the vehicle, shock, sustained vibration loads or other causes may cause the flinger to slip, causing the flinger to move towards the rolling elements and damaging them upon contact, resulting in wheel bearing failure.

SUMMARY

The present disclosure provides an improved sealing arrangement for a wheel bearing, which, for example, provides reliable sealing over the operational life and has a longer service life.

The sealing arrangement for a wheel bearing according to the disclosure includes a carrier element, a resilient sealing element and a counterflow plate. The carrier element can be connected to a first bearing part of the wheel bearing. The resilient sealing element comprises a resilient main body that is arranged on the carrier element. Furthermore, the resilient sealing element has at least one first axial sealing lip, one second axial sealing lip and at least one radial sealing lip, which extend away from the resilient main body. The counterflow plate can be connected to a second bearing part and arranged with one side facing the carrier element such that the first axial sealing lip, the second axial sealing lip and the radial sealing lip are in sliding contact with the counterflow plate. The first axial sealing lip is designed in such a way that it rests against the counterflow plate with a first contact force. The second axial sealing lip is designed in such a way that it rests against the counterflow plate with a second contact force. The radial sealing lip is designed in such a way that it rests against the counterflow plate with a third contact force. The contact forces are defined as a function of a predetermined force ratio.

The disclosed sealing lips are reliably prevented from being lifted from the counterflow plate. The lifting of the sealing lips is reliably prevented for all force conditions that can usually occur within the sealing arrangement during operation. Furthermore, contact between the two axial sealing lips can also be avoided in this way. The predetermined force ratio defines the contact forces in such a way that the contact forces of the axial sealing lips prevent the sealing lubricant, e.g. grease, from escaping from a sealing space, and the contact force of the radial sealing lip prevents the bearing lubricant, e.g. bearing grease, from escaping from the bearing. As a result, the sealing arrangement according to the disclosure can be used reliably even in very small installation spaces.

According to an example embodiment of the sealing arrangement, the predetermined force ratio is defined by the following equations:

$$\text{first contact force} = \text{second contact force} \pm 0.9 \text{ N} \quad (1)$$

$$\text{third contact force} = 0.5 * (\text{first contact force}) \pm 0.9 \text{ N} \quad (2)$$

The contact forces of the two axial sealing lips are substantially the same. The contact force of the radial sealing lip is essentially half that of the contact forces of the axial sealing lips, in order to reduce friction between the radial sealing lip and the counterflow plate, thus facilitating sliding between the radial sealing lip and the counterflow plate without reducing sealing performance. There is a tolerance range of around ±0.9 N for the dimensioning of the contact forces.

According to one embodiment, the main body of the resilient sealing element is arranged at a first axial distance from the counterflow plate in the axial direction, at least in the region of the axial sealing lips.

The first axial distance defines a free space, the sealing space which is formed between the main body and the counterflow plate, and serves to accommodate the sealing lubricant. Furthermore, the first and second axial sealing lips extend through this free space to the counterflow plate in order to prevent the escape of the sealing lubricant from the free space and to prevent dirt penetrating into the free space.

The first axial distance is selected as a function of the existing installation space for the sealing arrangement and can be, for example, greater than or equal to 1.7 mm, alternatively greater than or equal to 1.95 mm, or also greater than or equal to 2.0 mm.

According to one embodiment, the first axial sealing lip and the second axial sealing lip also have a first radial distance from one another on the counterflow plate and a second radial distance from one another on the carrier element in the radial direction. The first radial distance and the second radial distance are defined as a function of the first axial distance.

The design of the first and the second radial distance as a function of the first axial distance makes it possible to reliably avoid contact between the first axial sealing lip and the second axial sealing lip in the assembled and in the operating state. The first radial distance may be greater than the second radial distance and can be, for example, 1.24 times, 1.15 times or 1.03 times the first axial distance. The second radial distance can be, for example, the quotient with the first axial distance as the numerator and 1.27 or 1.45 or 1.59 as the denominator. In other words, the second radial distance can be, for example, approximately 0.787 times, 0.69 times or 0.629 times the first axial distance.

According to one embodiment, the first axial sealing lip on the main body has a first radial thickness in the radial direction and the second axial sealing lip on the main body has a second radial thickness in the radial direction. The first radial thickness and the second radial thickness are defined as a function of the second radial distance. Since the second radial distance is defined as a function of the first axial distance, the first radial thickness and the second radial thickness can also be defined as a function of the first axial distance.

The design of the first and the second radial thickness as a function of the second radial distance or the first axial distance makes it possible to reliably avoid contact between the first axial sealing lip and the second axial sealing lip in the assembled and in the operating state. The first radial thickness may be about the same as or slightly less than the second radial thickness and may be, for example, 0.50, 0.40 or 0.38 times the second radial distance. The second radial thickness can be, for example, 0.50 times, 0.45 times or 0.40 times the second radial distance.

According to an example embodiment, the first axial sealing lip and the second axial sealing lip are arranged obliquely with respect to an axis of rotation of the wheel bearing, and a diameter of the sealing lips, viewed in the axial direction, increases from the main body to the counterflow plate.

An oblique position of the axial sealing lips with respect to the axis of rotation makes it more difficult for the axial sealing lips to be lifted from the counterflow plate in the operating state, whereby the sealing performance of the seal is ensured for the force conditions usually occurring during operation. In addition, the oblique position of the axial sealing lips avoids contact between the sealing lips in the sealed state, e.g., in small installation spaces.

According to one embodiment, an inner peripheral surface of the first axial sealing lip is arranged at a first inner peripheral surface angle to the axis of rotation and an outer peripheral surface of the first axial sealing lip is arranged at a first outer peripheral surface angle to the axis of rotation, and the first outer peripheral surface angle is defined as a function of the first inner peripheral surface angle.

Alternatively or in addition, an inner peripheral surface of the second axial sealing lip is arranged at a second inner peripheral surface angle to the axis of rotation and an outer peripheral surface of the second axial sealing lip is arranged at a second outer peripheral surface angle to the axis of rotation. The second outer peripheral surface angle is defined as a function of the second inner peripheral surface angle.

This means that the thickness of the axial sealing lips changes from the carrier element to the counterflow plate. This supports or reinforces the effect of avoiding contact between the two axial sealing lips, which is already achieved by the oblique position of the two axial sealing lips with respect to the axis of rotation. If the two axial sealing lips touch, it is no longer possible to reliably prevent the sealing lubricant from escaping from the sealing space. Therefore, contact between the two axial sealing lips must be avoided.

If, for example, the first inner peripheral surface angle is between 25° and 28°, the first outer peripheral surface angle is greater by 4.7° than the first inner peripheral surface angle, for example, with a tolerance of ±1°. Furthermore, the first inner peripheral surface angle can, for example, be between 33° and 36°. The first outer peripheral surface angle is then, for example, 0.553° to 0.58° smaller than the first inner peripheral surface angle, with a tolerance of ±1°.

If, for example, the second inner peripheral surface angle is between 30° and 33°, the second outer peripheral surface angle is greater by 5.1° than the second inner peripheral surface angle, for example, with a tolerance of ±1°. Furthermore, the second inner peripheral surface angle can, for example, be between 36° and 39°. The second outer peripheral surface angle is then, for example, 0.335° to 0.352° smaller than the second inner peripheral surface angle, with a tolerance of ±1°.

According to one embodiment, a third axial sealing lip is also provided, which serves as a pre-seal. The pre-seal does not extend as far as the counterflow plate and creates a labyrinth seal that is designed to direct penetrating solid particles back to the outside and thereby protect the axial sealing lips from dirt or dirty water.

Further aspects of the disclosure relate to the use of a sealing arrangement described above for sealing a wheel bearing and a wheel bearing unit for a motor vehicle, having a wheel bearing and a sealing arrangement described above.

BRIEF DESCRIPTION OF THE DRAWINGS

Other measures improving the invention are described in more detail below together with the description of a preferred embodiment of the invention based on the figures. In the figures.

DETAILED DESCRIPTION

The figures are only schematic in nature and serve only for understanding of the disclosure. The same elements are provided with the same reference signs.

Figure 1:
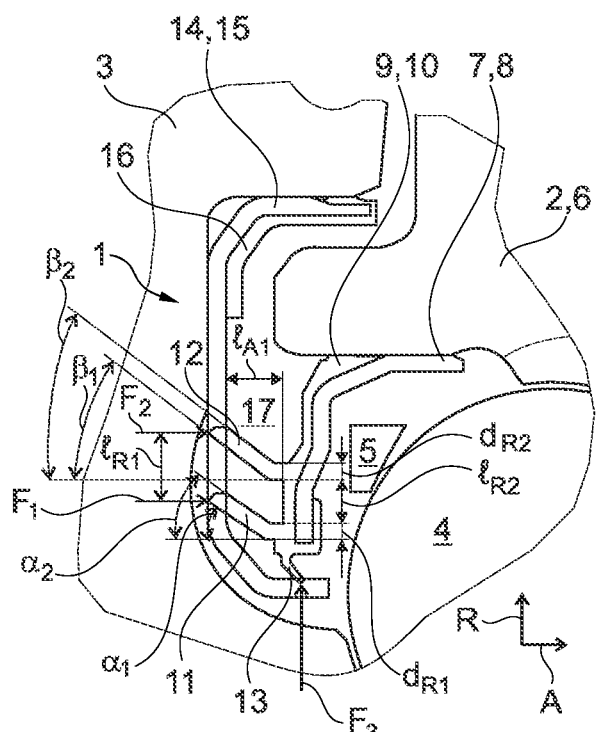
FIG. 1 shows a schematic longitudinal section of a wheel-flange-side sealing arrangement according to one embodiment of the disclosure.

FIG. 1 shows a sealing arrangement 1, which is arranged in the axial direction A between a wheel bearing 2 and a wheel bearing flange 3, wherein only sections of both the wheel bearing 2 and the wheel bearing flange 3 are shown. The wheel bearing 2 is designed as a roller bearing with rolling elements 4, which are held by a cage 5 in rolling raceways of bearing rings 6 holding the rolling elements 4.

The sealing arrangement 1 has a carrier element 7 which is fixed to one of the bearing rings 6 with a fastening section 8. A resilient sealing element 9 is arranged on the carrier element 7 and has a resilient main body 10 from which a first axial sealing lip 11, a second axial sealing lip 12 and a radial sealing lip 13 extend away. Furthermore, the sealing arrangement 1 has a counterflow plate 14 which is arranged facing the carrier element 7 such that it is in sliding contact with the axial sealing lips 11, 12 and the radial sealing lip 13. The counterflow plate 14 is fixed with a fastening section 15 to the wheel bearing flange 3 which is formed integrally with the other of the bearing rings 6 (not shown here). In addition, a resilient sealing element 16 is arranged on the counterflow plate 14 in the region of the fastening section 15 and seals a coupling point between the fastening section 15 and the wheel bearing flange 3.

The sliding contact is graphically illustrated by the overlapping representation of the sealing lips 11, 12, 13 with the counterflow plate 14. In practice, the sealing lips 11, 12, 13 do not overlap with the counterflow plate 14, but are in contact with the counterflow plate 14 in such a way that during a rotational movement of the wheel bearing flange 3, and thus of the counterflow plate 14, there is sliding contact between the sealing lips 11, 12, 13 and the counterflow plate 14. The sliding contact is individual for each of the sealing lips 11, 12, 13 and is defined in that the sealing lips 11, 12, 13 each rest against the counterflow plate 14 with a predetermined contact force F.

The first axial sealing lip 11 rests against the counterflow plate 14 with a first contact force $F_1$ and the second axial sealing lip 12 with a second contact force $F_2$. The radial sealing lip 13 rests against the counterflow plate 14 with a third contact force $F_3$. The first and the second contact forces $F_1$, $F_2$ are applied in the axial direction A and the third contact force $F_3$ is applied in the radial direction R.

The contact forces $F_1$, $F_2$ and $F_3$ are in a predetermined force ratio to one another, which defines the contact forces $F_1$, $F_2$, $F_3$ as functions of one another as follows:

$$F_1 = F_2 \pm 0.9 \text{ N} \quad (1)$$

and $$F_3 = 0.5 * F_1 \pm 0.9 \text{ N} \quad (2)$$

The specification of ±0.9 N indicates a tolerance range for the calculation of the forces.

The counterflow plate 14 is arranged in the axial direction A at a first axial distance $l_{A1}$ from the carrier element 7 with the resilient main body 10, so that a free space, i.e. a sealing space 17, is formed. The axial sealing lips 11, 12 substantially extend obliquely in the axial direction A through the sealing space 17 to the counterflow plate 14 and are spaced apart from one another in the radial direction R. The first axial sealing lip 11 is arranged further inward than the second axial sealing lip 12, viewed in the radial direction R.

The distance between the two axial sealing lips 11, 12 is not constant over their length, that is, a first radial distance $l_{R1}$ between the first axial sealing lip 11 and the second axial sealing lip 12 on the counterflow plate 14 differs from a second radial distance $l_{R2}$ between the first axial sealing lip 11 and the second axial sealing lip 12 on the carrier element 7. Both the first radial distance $l_{R1}$ and the second radial distance $l_{R2}$ are defined as a function of the first axial distance $l_{A1}$. In the embodiment shown in this figure, the first axial distance $l_{A1}$ is, for example, greater than or equal to 1.7 mm and the first radial distance $l_{R1}$ and the second radial distance $l_{R2}$ are defined, for example, as follows:

$$l_{R1} = l_{A1} * 1.24 \quad (3)$$

and $$l_{R2} = l_{A1} / 1.27 \quad (4)$$

In addition, the first axial sealing lip 11 on the carrier element 7 has a first radial thickness $d_{R1}$, and the second axial sealing lip 12 on the carrier element 7 has a second radial thickness $d_{R2}$. The two radial thicknesses $d_{R1}$, $d_{R2}$ are in turn defined as a function of the second radial distance $l_{R2}$ and are therefore also defined as a function of the first axial distance $l_{A1}$:

$$d_{R1} = l_{R2} * 0.38 = (l_{A1}/1.27) * 0.38 \quad (5)$$

and $$d_{R2} = l_{R2} * 0.4 = (l_{A1}/1.27) * 0.4 \quad (6)$$

Furthermore, the thickness of the axial sealing lips 11, 12 also changes over their direction of extension. This change in thickness is indicated by a ratio between an inner peripheral surface angle and an outer peripheral surface angle of the respective axial sealing lip 11, 12. An angle between an inner peripheral surface of the respective axial sealing lip 11, 12 and an axis of rotation (not shown) of the sealing arrangement 1 is referred to as an inner peripheral surface angle, and an angle between an outer peripheral surface of the respective axial sealing lip 11, 12 and the axis of rotation of the sealing arrangement 1 is referred to as an outer peripheral surface angle. The outer peripheral surface angle is a function of the inner peripheral surface angle.

In the embodiment shown in FIG. 1, a first inner peripheral surface angle $\alpha_1$ of the first axial sealing lip 11 is between 33° and 36°. A second inner peripheral surface angle $\beta_1$ of the second axial sealing lip 12 is between 36° and 39°. A first outer peripheral surface angle $\alpha_2$ and a second outer peripheral surface angle $\beta_2$ are then defined as follows:

$$\alpha_2 = (\alpha_1 - 0.553°) \pm 1° \quad (7)$$

and $$\beta_2 = (\beta_1 - 0.342°) \pm 1° \quad (8)$$

The specification ±1° indicates a tolerance range for the dimensioning of the angle.

It can thus be seen that the sealing arrangement 1 is designed firstly by means of the contact forces of the sealing lips 11, 12, 13 on the counterflow plate 14 and secondly as a function of the first axial distance $l_{A1}$. The first axial distance $l_{A1}$ is directly related to the installation space available for the sealing arrangement 1. This means that the sealing arrangement 1 is designed essentially as a function of the available installation space and the necessary first contact force $F_1$.

Figure 2:
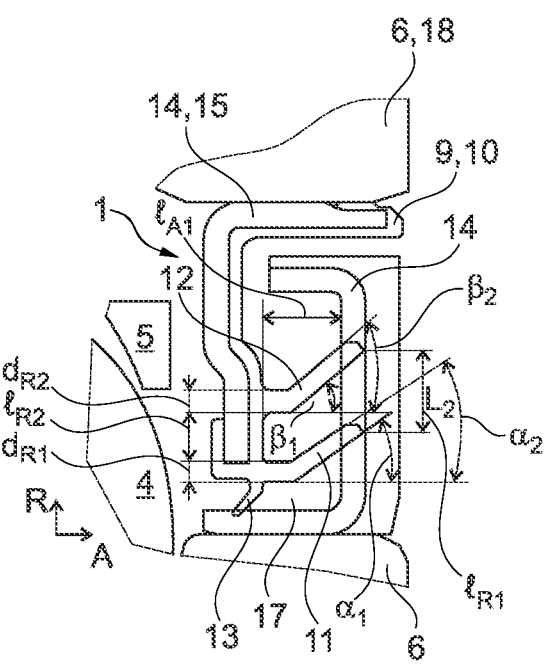
FIG. 2 shows a schematic longitudinal section of a vehicle-side sealing arrangement according to one embodiment of the disclosure.

FIG. 2 shows the sealing arrangement 1, which is arranged in the axial direction A between a wheel bearing 2 and a chassis 18, wherein only sections of both the wheel bearing 2 and the chassis 18 are shown. The structure of the sealing arrangement 1 is very similar to that of the embodiment shown in FIG. 1, for which reason only the differences are discussed below. Due to a different installation position of the sealing arrangement 1, which is arranged mirror-inverted compared to FIG. 1, the first axial distance $l_{A1}$ is greater than or equal to 1.95 mm. This results in the following length and angle ratios for the embodiment shown here:

$$l_{R1} = l_{A1} * 1.03$$

$$l_{R2} = l_{A1} / 1.59$$

$$d_{R1} = l_{R2} * 0.40 = (l_{A1}/1.59) * 0.40$$

$$d_{R2}=l_{R2}*0.45=(l_{A1}/1.59)*0.45$$

$$\alpha_1=33° \text{ to } 36° \text{ and } \alpha_2=(\alpha_1-0.58°)\pm1°$$

$$\beta_1=36° \text{ to } 39° \text{ and } \beta_2=(\beta_1-0.335°)\pm1°$$

The force ratio of the contact forces $F_1$, $F_2$ and $F_3$ corresponds to the force ratio described with reference to FIG. 1.

Figure 3:
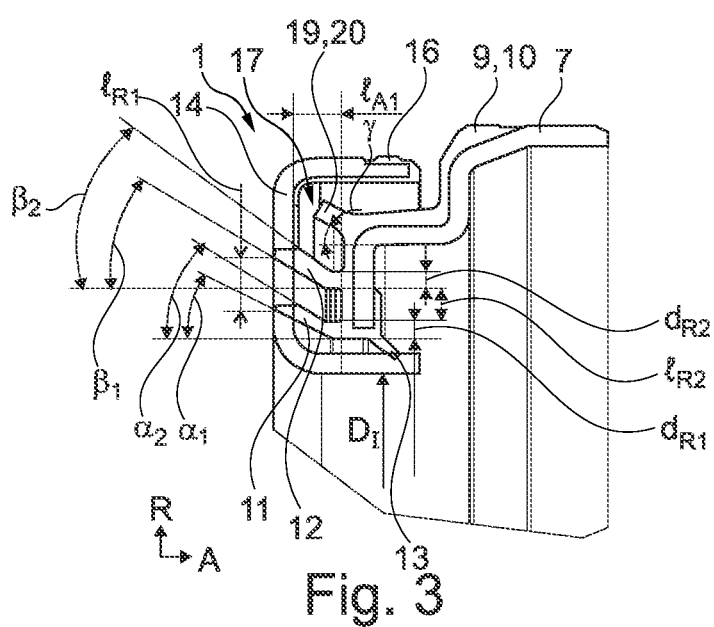
FIG. 3 shows a schematic longitudinal section of a wheel-flange-side sealing arrangement according to a further embodiment of the disclosure.

FIG. 3 shows a further embodiment of the sealing arrangement 1 according to the disclosure. It can be seen that the carrier element 7 is designed slightly differently and the sealing arrangement 1 is shown alone, without reference to adjacent elements. In this embodiment too, the force ratio of the contact forces $F_1$, $F_2$ and $F_3$ corresponds to the force ratio described with reference to FIG. 1.

In the embodiment shown here, the first axial distance $l_{A1}$ is greater than or equal to 2 mm. This results in the following length and angle ratios:

$$l_{R1}=l_{A1}*1.15$$

$$l_{R2}=l_{A1}/1.45$$

$$d_{R1}=l_{R2}*0.50=(l_{A1}/1.45)*0.50$$

$$d_{R2}=l_{R2}*0.50=(l_{A1}/1.45)*0.50$$

$$\alpha_1=25° \text{ to } 28° \text{ and } \alpha_2=(\alpha_1\pm4.7°)\pm1°$$

$$\beta_1=30° \text{ to } 33° \text{ and } \beta_2=(\beta_1+5.1°)\pm1°$$

In addition, the sealing arrangement 1 shown here also has a third axial sealing lip 19 which does not extend as far as the counterflow plate 14 and is arranged outside of the second axial sealing lip 12 when viewed in the radial direction R. The third axial sealing lip 19 serves as a pre-seal 20 and forms a labyrinth seal in the sealing space 17, which is intended to direct particles penetrating from the outside, such as dirt, dirty water, dust, etc., back to the outside. For this purpose, the third axial sealing lip 19 is arranged obliquely outwards at an angle γ relative to the axis of rotation of the sealing arrangement 1, wherein the angle γ is approximately 30° here, for example. The pre-seal 20 is intended to protect the first and the second axial sealing lip 11, 12 from the penetrating particles, whereby the service life of the sealing arrangement 1 can be further increased.

In addition, an inner diameter $D_I$ of the counterflow plate 14 is indicated in FIG. 3, which is 80 mm here, for example.

REFERENCE NUMERALS

1 Sealing arrangement
2 Wheel bearing
3 Wheel bearing flange
4 Rolling element
5 Cage
6 Bearing ring
7 Carrier element
8 Fastening section
9 Resilient sealing element
10 Resilient main body
11 First axial sealing lip
12 Second axial sealing lip
13 Radial sealing lip
14 Counterflow plate
15 Fastening section
16 Sealing element
17 Sealing space
18 Chassis
19 Third axial sealing lip
20 Pre-seal
F, $F_1$, $F_2$, $F_3$ Contact force
$l_{A1}$ Axial distance
$l_{R1}$, $l_{R2}$ Radial distance
$d_{R1}$, $d_{R2}$ Radial thickness
$D_I$ Inner diameter
$\alpha_1$, $\beta_1$ Inner peripheral surface angle
$\alpha_2$, $\beta_2$ Outer peripheral surface angle
γ Angle
R Radial direction
A Axial direction

The invention claimed is:

1. A sealing arrangement for a wheel bearing, comprising:
a carrier element which can be connected to a first bearing part of the wheel bearing;
a resilient sealing element which comprises a resilient main body that is arranged on the carrier element, wherein the resilient sealing element also comprises at least a first axial sealing lip and a second axial sealing lip and at least one radial sealing lip that extend away from the resilient main body; and
a counterflow plate which can be connected to a second bearing part and is arranged with one side facing the carrier element such that the first axial sealing lip, the second axial sealing lip and the radial sealing lip are in sliding contact with the counterflow plate, wherein:
the first axial sealing lip is designed in such a way that it rests against the counterflow plate with a first contact force ($F_1$);
the second axial sealing lip is designed such that it rests against the counterflow plate with a second contact force ($F_2$);
the radial sealing lip is designed such that it rests against the counterflow plate with a third contact force ($F_3$); and
the first and second contact forces ($F_1$, $F_2$) are defined as a function of a predefined force ratio defined by the following equation:
the first contact force ($F_1$)=the second contact pressure ($F_2$)±0.9 N.

2. The sealing arrangement according to claim 1, wherein the resilient main body of the resilient sealing element is arranged, at least in a region of the first and second axial sealing lips, in an axial direction (A) at a first axial distance ($l_{A1}$) from the counterflow plate.

3. The sealing arrangement according to claim 2, wherein the first axial sealing lip and the second axial sealing lip have a first radial distance ($l_{R1}$) from one another in a radial direction (R) on the counterflow plate and have a second radial distance ($l_{R2}$) from each other on the carrier element, wherein the first radial distance ($l_{R1}$) and the second radial distance ($l_{R2}$) are defined as a function of the first axial distance ($l_{A1}$).

4. The sealing arrangement according to claim 3, wherein the first axial sealing lip on the resilient main body has a first radial thickness ($d_{R1}$) in the radial direction (R), and the second axial sealing lip on the resilient main body has a second radial thickness ($d_{R2}$) in the radial direction (R), wherein the first radial thickness ($d_{R1}$) and the second radial thickness ($d_{R2}$) are defined as a function of the second radial distance ($l_{R2}$).

5. The sealing arrangement according to claim 1, wherein the first axial sealing lip and the second axial sealing lip are arranged obliquely with respect to an angle in relation to an axis of rotation of the wheel bearing, wherein a diameter of the axial sealing lips, viewed in an axial direction (A), increases from the resilient main body to the counterflow plate.

6. The sealing arrangement according to claim 5, wherein an inner peripheral surface of the first axial sealing lip is arranged at a first inner peripheral surface angle ($\alpha_1$) to the axis of rotation and an outer peripheral surface of the first axial sealing lip is arranged at a first outer peripheral surface angle ($\alpha_2$) to the axis of rotation, wherein the first outer peripheral surface angle ($\alpha_2$) is defined as a function of the first inner peripheral surface angle ($\alpha_1$).

7. The sealing arrangement according to claim 5, wherein an inner peripheral surface of the second axial sealing lip is arranged at a second inner peripheral surface angle ($\beta_1$) to the axis of rotation and an outer peripheral surface of the second axial sealing lip is arranged at a second outer peripheral surface angle ($\beta_2$) to the axis of rotation, wherein the second outer peripheral surface angle ($\beta_2$) is defined as a function of the second inner peripheral surface angle ($\beta_1$).

8. A wheel bearing comprising a sealing arrangement according to claim 1.

9. A wheel bearing unit for a motor vehicle, comprising:
a wheel bearing which is designed as a roller bearing, and
a sealing arrangement according to claim 1, which is arranged adjacent to at least one axial side of the wheel bearing.

10. A sealing arrangement for a wheel bearing, comprising:
a carrier element connectable to a first bearing part of the wheel bearing;
a resilient sealing element comprising:
a resilient main body arranged on the carrier element;
a first axial sealing lip extending away from the resilient main body;
a second axial sealing lip extending away from the resilient main body; and
a radial sealing lip extending away from the resilient main body, and
a counterflow plate connectable to a second bearing part of the wheel bearing, the counterflow plate being arranged with one side facing the carrier element such that the first axial sealing lip, the second axial sealing lip and the radial sealing lip are in sliding contact with the counterflow plate, wherein:
the first axial sealing lip rests against the counterflow plate with a first contact force;
the second axial sealing lip rests against the counterflow plate with a second contact force;
the first contact force is equal to the second contact force ±0.9 N;
the radial sealing lip rests against the counterflow plate with a third contact force; and
the third contact force is half of the first contact force ±0.9 N.

11. The sealing arrangement of claim 10, wherein a region of the resilient main body radially between the first axial sealing lip and the second axial sealing lip is arranged at a first axial distance from the counterflow plate.

12. The sealing arrangement of claim 11, wherein:
the first axial sealing lip is disposed at a first radial distance from the second axial sealing lip when measured on the counterflow plate;

the first radial distance is between 1.03 and 1.24 times the first axial distance;
the first axial sealing lip is disposed at a second radial distance from the second axial sealing lip when measured on the carrier element; and
the second radial distance is between 0.629 and 0.787 times the first axial distance.

13. The sealing arrangement of claim 12, wherein:
the first axial sealing lip comprises a first radial thickness measured at the resilient main body;
the first radial thickness is between 0.38 and 0.5 times the second radial distance;
the second axial sealing lip comprises a second radial thickness measured at the resilient main body; and
the second radial thickness is between 0.4 and 0.5 times the second radial distance.

14. The sealing arrangement of claim 11, wherein:
the first axial sealing lip is disposed at a first radial distance from the second axial sealing lip when measured on the counterflow plate;
the first axial sealing lip is disposed at a second radial distance from the second axial sealing lip when measured on the carrier element; and
the second radial distance is between 0.629 and 0.787 times the first radial axial distance.

15. The sealing arrangement of claim 14, wherein:
the first axial sealing lip comprises a first radial thickness measured at the resilient main body;
the first radial thickness is between 0.38 and 0.5 times the second radial distance;
the second axial sealing lip comprises a second radial thickness measured at the resilient main body; and
the second radial thickness is between 0.4 and 0.5 times the second radial distance.

16. The sealing arrangement of claim 10, wherein:
a first diameter of the first axial sealing lip increases as the first axial sealing lip extends from the resilient main body towards the counterflow plate; and
a second diameter of the second axial sealing lip increases as the second axial sealing lip extends from the resilient main body towards the counterflow plate.

17. The sealing arrangement of claim 16, wherein:
the first axial sealing lip comprises:
a first inner peripheral surface arranged at a first inner peripheral surface angle measured relative to an axis of rotation of the sealing arrangement; and
a first outer peripheral surface arranged at a first outer peripheral surface angle, different than the first inner peripheral surface angle, measured relative to the axis of rotation.

18. The sealing arrangement of claim 16, wherein:
the second axial sealing lip comprises:
a second inner peripheral surface arranged at a second inner peripheral surface angle measured relative to an axis of rotation of the sealing arrangement; and
a second outer peripheral surface arranged at a second outer peripheral surface angle, different than the second inner peripheral surface angle, measured relative to the axis of rotation.

* * * * *